United States Patent [19]

Schweitzer

[11] Patent Number: 4,784,304
[45] Date of Patent: Nov. 15, 1988

[54] TACKLE BOX

[76] Inventor: Charles Schweitzer, 3925 Newportville Rd., Newportville, Pa. 19056

[21] Appl. No.: 105,901

[22] Filed: Oct. 8, 1987

[51] Int. Cl.⁴ .................... A45F 3/02; A01K 97/06
[52] U.S. Cl. .................................. 224/202; 224/920
[58] Field of Search .............. 224/202, 240, 920; 206/315.11, 373, 811; 190/102–104, 109, 110; 43/54.1

[56] References Cited

U.S. PATENT DOCUMENTS

| | | | |
|---|---|---|---|
| 2,691,400 | 10/1954 | Giordano | 224/920 |
| 3,001,566 | 9/1961 | Lipsitz | 224/202 |
| 3,537,628 | 11/1970 | Thompson | 224/920 |
| 3,678,611 | 7/1972 | Files | 224/920 |
| 4,372,073 | 2/1983 | Goldman | 224/920 |
| 4,424,841 | 1/1984 | Smith | 224/240 |

Primary Examiner—Renee S. Luebke
Attorney, Agent, or Firm—Jerry T. Kearns

[57] ABSTRACT

A fishing tackle box especially designed for use by wading fishermen includes a generally rectangular box with accordion fold expandable pouches. The tackle box includes flotation compartments to ensure flotation of the tackle box in the event it is dropped into a body of water. The tackle box also includes holding straps for a fishing rod and a variety of pockets and compartments for holding various fishing accessories. The tackle box is constructed from a heavyweight fabric material and is provided with VELCRO closures for the various assorted pockets.

9 Claims, 4 Drawing Sheets

TACKLE BOX

BACKGROUND OF THE INVENTION

1. Field of the Invention

The present invention relates to tackle boxes, and more particularly pertains to a new and improved tackle box especially designed to be carried by wading fishermen. When a fishermen is wading in a lake or river, it is an annoying inconvenience to have to return to the shore in order to change lures, bait a hook or retrieve an accessory item. The typical type of tackle box is a rigid plastic or metal box which is difficult to carry while fishing. These types of tackle boxes must be left in the fisherman's car or on the bank while the fisherman is wading in the lake or river. The present invention overcomes these difficulties by providing a tackle box designed to be carried on a shoulder strap by a wading fisherman. The tackle box of the present invention provides a variety of pouches for storage of various fishing accessories and includes flotation compartments for ensuring that the tackle box and contents will remain afloat if dropped into a body of water.

2. Description of the Prior Art

Various types of tackle boxes are known in the prior art. A typical example of such a tackle box is to be found in U.S. Pat. No. 2,797,137, which issued to L. Forde on June 25, 1957. This patent discloses a tackle box constructed from a rigid material such as plastic or sheet metal and provided with a shoulder strap so that the tackle box may be carried over the shoulder of a fisherman. The rigid tackle box is provided with a rounded top portion to avoid contact of any sharp edges with the fisherman. The device has a variety of drawers for storage of various fishing accessories. U.S. Pat. No. 2,823,971, which issued to H. Hoyt on Feb. 18, 1958, discloses a tackle box constructed from a rigid material and provided with carrying straps for transportation of the tackle box by a fisherman. The rigid tackle box is provided with a variety of storage compartments for various accessory items and includes a pair of loops for the storage of a fishing rod when not in use. U.S. Pat. No. 3,481,066, which issued to R. Woolworth on Dec. 2, 1969, discloses a tackle box constructed from a rigid material and provided with various removable storage compartments. The tackle box is constructed of two box like portions connected by a hinge. U.S. Pat. No. 4,210,244, which issued to D. Westrick on July 1, 1980, discloses a carrier for tools constructed from a flexible fabric arranged for rolling or folding into a compact article. VELCRO fastening strips are provided for securing the carrier in a closed condition. U.S. Pat. No. 4,488,669, which issued to J. Waters on Dec. 18, 1984, discloses a truck tool box constructed from a high density polyethylene material which is provided with various storage compartments.

While the above mentioned devices are suited for their intended usage, none of these devices provides a tackle box formed from a heavy fabric material which includes expanding accordion fold pouches. Further, none of the aforesaid tackle boxes provide a portable tackle box suited for use by a wading fisherman. Inasmuch as the art is relatively crowded with respect to these various types of tackle boxes, it can be appreciated that there is a continuing need for and interest in improvements to such tackle boxes, and in this respect, the present invention addresses this need and interest.

SUMMARY OF THE INVENTION

In view of the foregoing disadvantages inherent in the known types of tackle boxes now present in the prior art, the present invention provides an improved tackle box. As such, the general purpose of the present invention, which will be described subsequently in greater detail, is to provide a new and improved tackle box which has all the advantage of the prior art tackle boxes and none of the disadvantages.

To attain this, representative embodiments of the concepts of the present invention are illustrated in the drawings and make use of a generally rectangular box formed from a heavyweight fabric material provided with a pair of accordion fold expandable storage pouches. The tackle box of the present invention also utilizes a pair of enclosed flotation compartments for ensuring that the tackle box and contents will not sink if dropped into a body of water. The tackle box further utilizes various removable storage compartments for the reception of fishing accessory articles and is provided with a pair of straps for holding a fishing rod. An additional feature of the present invention is the provision of a removable storage container having a plurality of pockets formed from a stretchable fabric material for the secure reception and storage of bait containers. Mounting loops are provided at side portions of the tackle box for attachment of a removable shoulder strap, thus the tackle box of the present invention may be conveniently carried by a fisherman while wading in a body of water.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tackle box which has all the advantages of the prior art tackle boxes and none of the disadvantages.

It is another object of the present invention to provide a new and improved tackle box which may be easily and efficiently manufactured and marketed.

It is a further object of the present invention to provide a new and improved tackle box which is of a durable and reliable construction.

An even further object of the present invention is to provide a new and improved tackle box which is susceptible of a low cost of manufacture with regard to both materials and labor, and which accordingly is then susceptible of low prices of sale to the consuming public, thereby making such tackle boxes economically available to the buying public.

Still yet another object of the present invention is to provide a new and improved tackle box which provides in the apparatuses and methods of the prior art some of the advantages thereof, while simultaneously overcoming some of the disadvantages normally associated therewith.

Still another object of the present invention is to provide a new and improved tackle box designed to be carried by a wading fisherman and provided with flotation compartments for preventing loss of the tackle box if it should be dropped into a body of water.

Yet another object of the present invention is to provide a new and improved tackle box constructed from a heavyweight fabric material which provides a pair of accordion fold expandable storage pouches for the reception of various fishing accessory items.

Even still another object of the present invention is to provide a new and improved tackle box which is provided with various removable storage trays and pair of VELCRO fastened straps for holding a fishing rod, thus freeing the hands of a fisherman while wading in a body of water.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
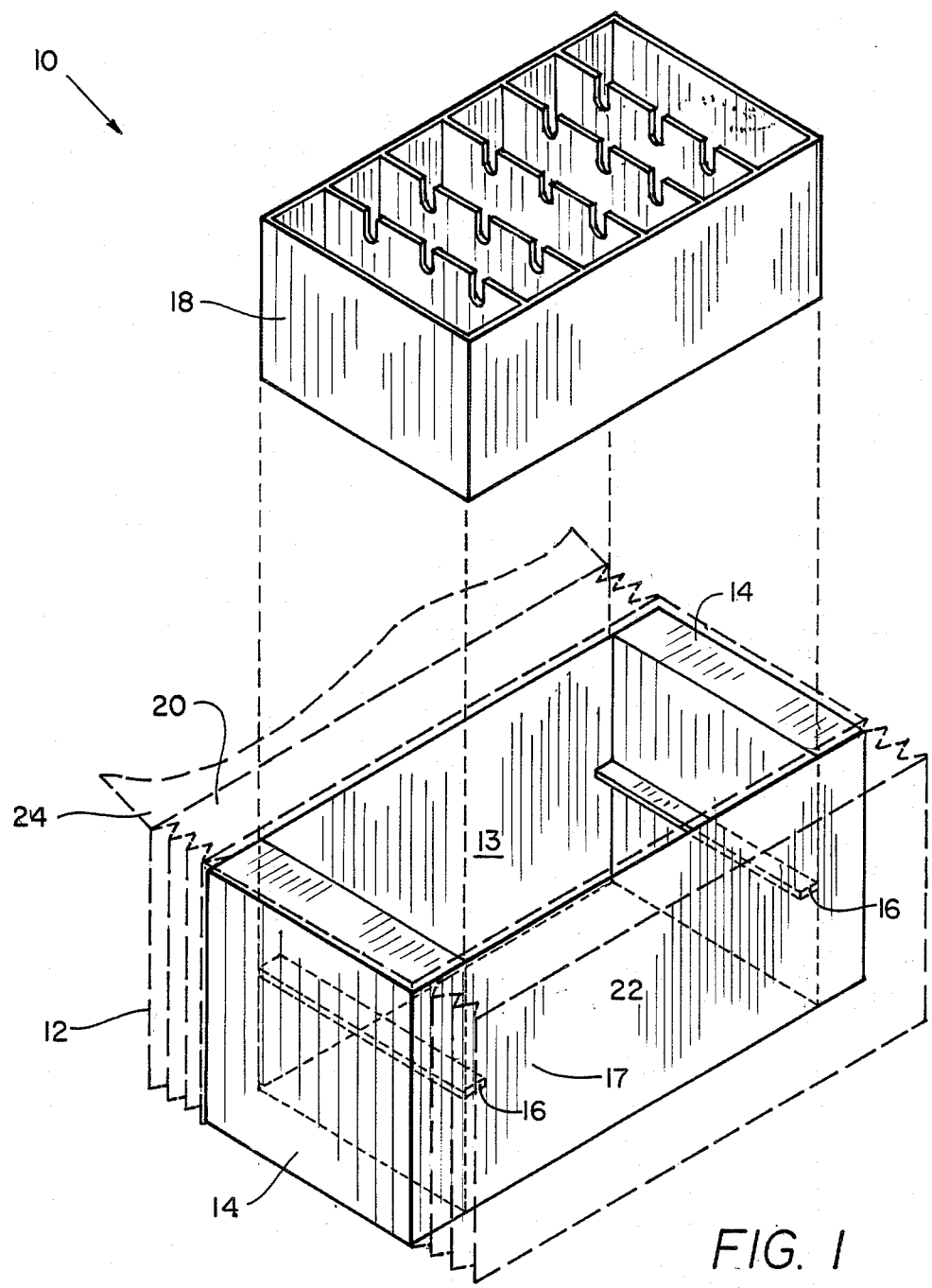
FIG. 1 is a perspective diagrammatic view of the tackle box of the present invention.

With reference now to the drawings, and in particular to FIG. 1 thereof, a new and improved tackle box embodying the principles and concepts of the present invention and generally designated by the reference numeral 10 will be described.

More specifically, it will be noted that the first embodiment 10 of the invention includes a generally rectangular box 12 constructed from a heavy duty fabric material. A closure flap 24 is integrally formed with the fabric box 12, and provided with VELCRO closure strips. The fabric box 12 forms two accordion fold expandable storage pouches, a back storage pouch 20 and a front storage pouch 22. Within a main central compartment of the fabric box 12, a solid box 13 is received. A pair of sealed plastic flotation compartments 14 are formed at the ends of the box 13. Each of these compartments 14 is provided with a ledge 16 for supporting a removable storage compartment tray 18. An additional storage space 17 is formed in the box 13, beneath the ledges 16. The buoyancy of the flotation compartments 14 is sufficient to float the tackle box 10, even when the tackle box is filled with a variety of fishing accessories.

Figure 2:
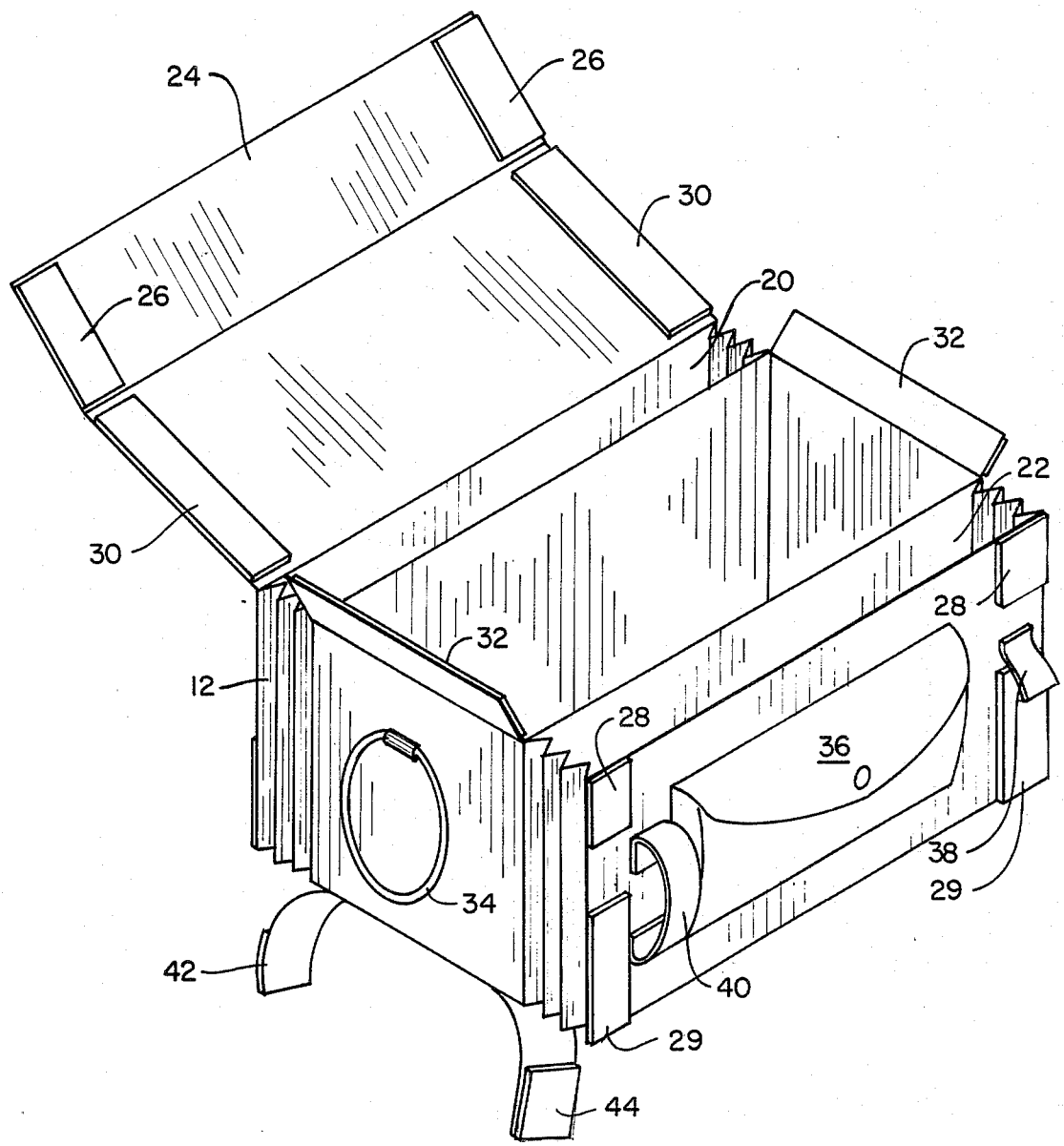
FIG. 2 is a perspective view of the tackle box of the present invention illustrating the outer fabric portion thereof.

With reference now to FIG. 2, it may be seen that the closure flap 24 is provided with VELCRO closure strips 26 and 30 designed for cooperation with corresponding VELCRO closure strips 28 and 29 on a front portion of the fabric box 12. A pair of flaps 32 are integrally formed on opposite sides of the fabric box 12 and, in use, are folded over the tops of the flotation compartments 14. These flaps 32 are provided with VELCRO closure strips, adapted for cooperation with VELCRO closure strips 30 on flap 24. A pair of VELCRO straps 38 and 40 are provided for holding a fishing rod, thus freeing the hands of a wading fisherman while changing a lure or performing some other activity. A pair of attachment loops 34 are provided on opposite sides of the fabric box 12 for attachment to a removable shoulder strap (not shown). This enables the tackle box 10 of the present invention to be easily carried by a fisherman while wading in a body of water. An accessory pocket 36 for storage of sunglasses or other items is provided on a front portion of the fabric box 12 and a pair of VELCRO straps 42 and 44 are provided at a bottom portion for attachment of various fishing accessory items.

Figure 3:
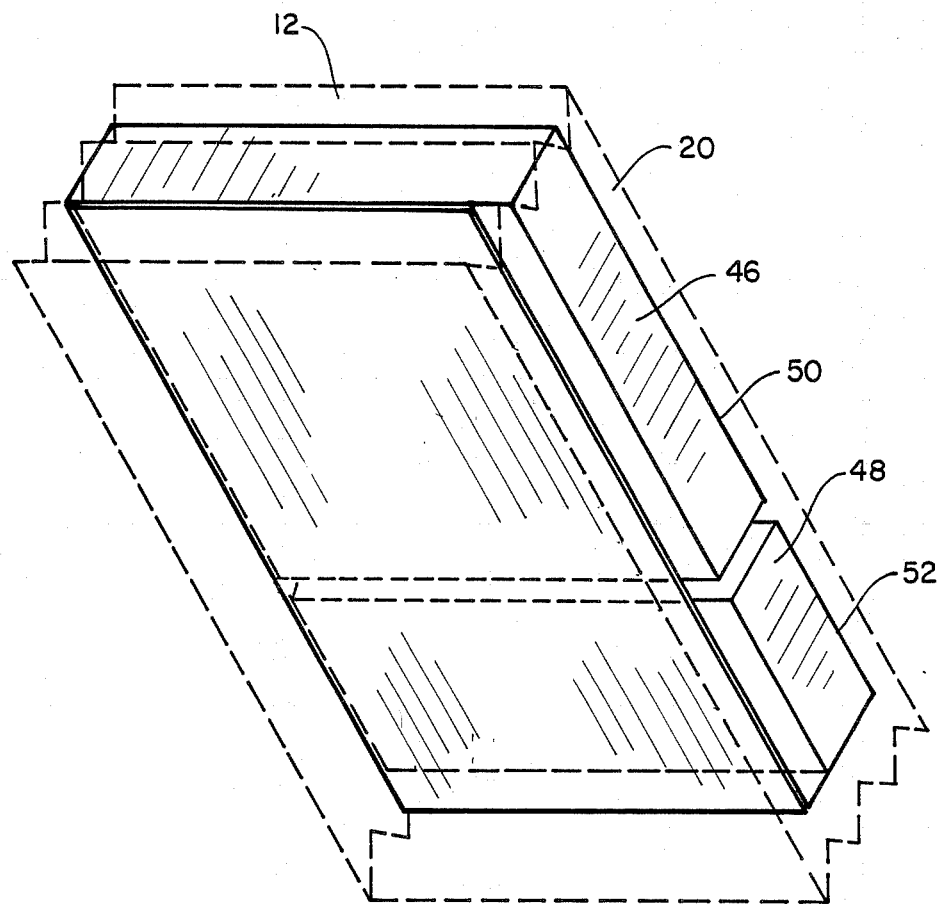
FIG. 3 is a partial diagrammatic view illustrating the rear accordion fold expandable storage pouch.

In FIG. 3, it may be seen that the expandable back pouch 20 is provided with two storage boxes 46 and 48. A back side of each of these boxes is provided with a VELCRO fastening strip at 50 and 52 for securing the boxes to corresponding VELCRO fastening strips on the interior of the pouch 20. Storage boxes 46 and 48 occupy only a portion of the available interior volume of the expandable storage pouch 20, thus leaving a substantial volume of space to receive various other fishing accessory items. Storage boxes 46 and 48 may be utilized to store fishing weights, bait and a variety of other items.

Figure 4:
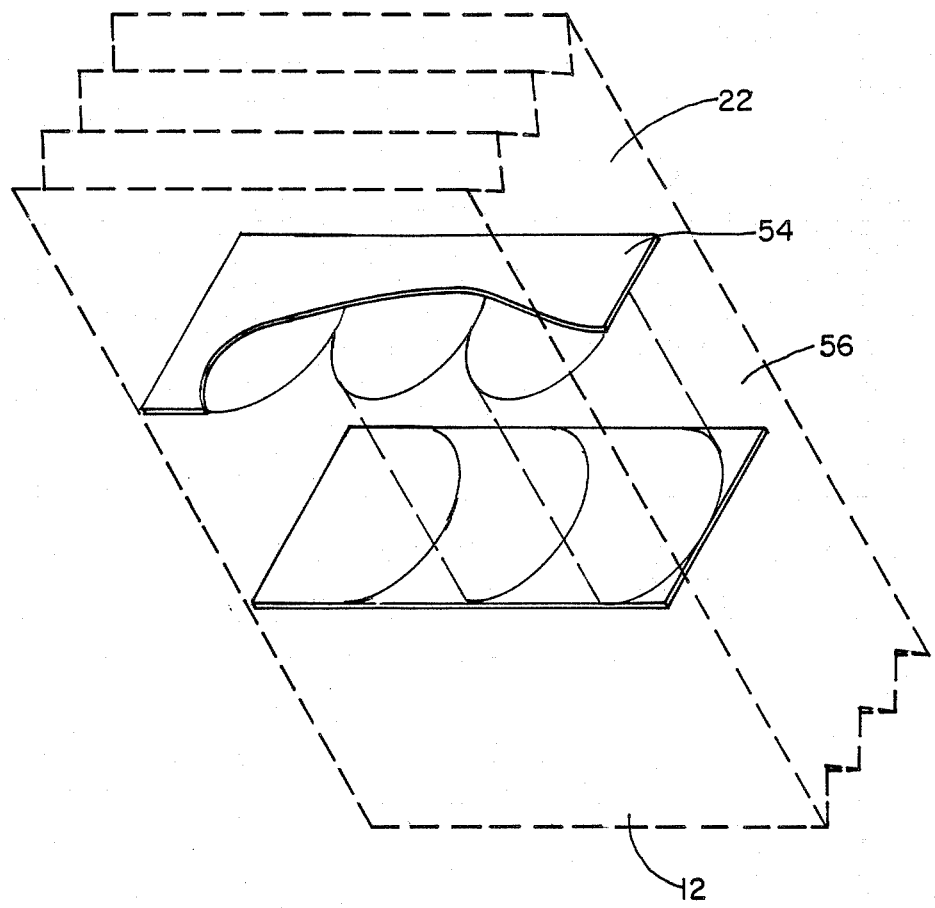
FIG. 4 is a partial diagrammatic view illustrating the front accordion fold expandable storage pouch.

FIG. 4 provides a diagrammatic illustration of the front expandable storage pouch 22. A removable storage container 54 is secured by cooperating VELCRO fastening strips at 56 to the interior of the expandable pouch 22. The storage pouch 54 is compartmentalized and features interior pouches formed from a stretchable fabric material designed to receive circular storage jars.

These stretchable fabric pouches securely maintain these circular storage jars in position, while preventing them from rattling together or breaking.

The fabric box 12 is preferably formed from a heavyweight fabric material such as nylon or canvas and the interior storage compartments as well as the flotation compartments 14 are preferably formed from a tough transparent nonreactive plastic material that will not melt or degrade from prolonged contact with rubber worms and other fishing lures.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved tackle box, comprising:
a generally rectangular box formed from a heavy duty fabric material;
a closure flap integrally formed on said fabric box;
cooperating VELCRO closure fastening strips on a front wall of said fabric box and on said closure flap;
shoulder strap attachment loops formed on opposed exterior side walls of said fabric box;
a pair of VELCRO fastened fishing rod holding straps on a front exterior wall of said fabric box;
a sunglasses case on said front wall between said fishing rod holding straps;
a rear accordion fold expandable storage pouch adjacent an interior back wall of said box;
a front accordion fold expandable pouch adjacent a front interior wall of said fabric box;
a central compartment formed between said front and rear storage pouches in said fabric box;
a pair of flotation compartments in said central compartment adjacent opposed interior side walls thereof;
each of said flotation compartments having a transversely extending support ledge formed thereon;
a compartmentalized storage tray removably received in said central compartment on said support ledges;
a pair of retaining flaps integrally formed with said fabric box adjacent opposed top side wall edges of said central compartment;
said retaining flaps having VELCRO fastening strips and adapted to overlie said flotation compartments; and
a pair of shoulder strap attaching loops formed on opposed exterior side walls of said fabric box.

2. A new and improved tackle box, comprising:
a box formed from a heavy duty fabric material;
a closure flap formed on said fabric box;
at least one accordion fold expandable pouch on said box;
at least one flotation compartment in said box;
a support ledge on said flotation compartment; and
a compartmentalized storage tray removably received on said ledge within said box.

3. The tackle box of claim 2, further comprising shoulder strap attachment loops on opposed exterior side walls of said fabric box.

4. The tackle box of claim 2, wherein said box has a rear accordion fold expandable pouch adjacent a back wall of said box and a front accordion fold expandable pouch adjacent a front wall of said box.

5. The tackle box of claim 4, further comprising a compartmentalized storage container in said front storage pouch, said compartmentalized storage container having a plurality of interior pouches formed from a stretchable fabric material and cooperating VELCRO fastening strips for retaining said compartmentalized storage container in said front pouch.

6. The tackle box of claim 4, further comprising at least one storage box removably retained within said rear pouch.

7. The tackle box of claim 6, further comprising cooperating VELCRO fastening strips for retaining said storage box in said rear pouch.

8. A new and improved tackle box, comprising:
a box formed from a heavy duty fabric material;
a closure flap formed on said fabric box;
at least one accordion fold expandable pouch on said box;
at least one flotation compartment in said box; and
a pair of VELCRO fastened straps on a front exterior wall of said box for holding a fishing rod.

9. The tackle box of claim 8, further comprising a sunglasses storage case mounted on said front exterior wall between said pair of VELCRO fastened straps.

* * * * *